United States Patent
Herbst et al.

Patent Number: 6,135,293
Date of Patent: Oct. 24, 2000

[54] WATER/SLUDGE FILTER PRESS

[76] Inventors: Lori B. Herbst; Robert Herbst, both of 3201 S. Zuni St. Unit B, Englewood, Colo. 80110

[21] Appl. No.: 09/133,049

[22] Filed: Aug. 13, 1998

[51] Int. Cl.$^7$ ............................ B01D 25/12; B01D 29/27; B30B 9/06

[52] U.S. Cl. ........................ 210/351; 210/352; 100/116; 100/122; 100/123

[58] Field of Search .................................. 210/350, 351, 210/352; 100/116, 122, 123

[56] References Cited

U.S. PATENT DOCUMENTS

| | | |
|---|---|---|
| 218,879 | 8/1879 | Hartshorn . |
| 260,542 | 7/1882 | Dannecker . |
| 2,022,679 | 12/1935 | Leo . |
| 5,031,524 | 7/1991 | Wettlaufer . |
| 5,045,186 | 9/1991 | Takashima . |

*Primary Examiner*—Thomas M. Lithgow
*Attorney, Agent, or Firm*—Edwin H. Crabtree; Ramin L. Pizarro; Donald W. Margolis

[57] ABSTRACT

A water/sludge filter press used with a filter bag for filtering water and collecting sludge in the bag. When the filter press is actuated, the filter bag is compressed therein for dewatering the sludge in the bag for ease in removing the sludge and reusing the bag or replacing the bag. The filter press includes a horizontal stand with an upright vertical press frame. A hydraulic cylinder with piston is mounted on the vertical press frame. Attached to the vertical press frame is an open-top housing adapted for receiving the filter bag therein. The sides and bottom of the housing are lined with screens for passing filtered water therethrough. The housing includes a first vertical side, a second vertical side, a stationary vertical press plate, a vertical movable press plate and a foldable bottom. The foldable bottom includes a pair of pivot arms attached to the piston of the hydraulic cylinder. The foldable bottom is also attached to a lower end of a pair of coil springs. An upper end of the coil springs is attached to one end of a pair of spring arms. An opposite end of the spring arms is attached to the vertical movable press plate and the vertical stationary press plate. When the hydraulic cylinder is actuated, the piston moves upwardly pivoting the pivot arms downwardly folding the bottom and moving the movable press plate inwardly in the filter housing. At this time the filter bag is compressed between the stationary press plate and the movable press plate with the sludge therein being compressed and dewatered.

13 Claims, 2 Drawing Sheets

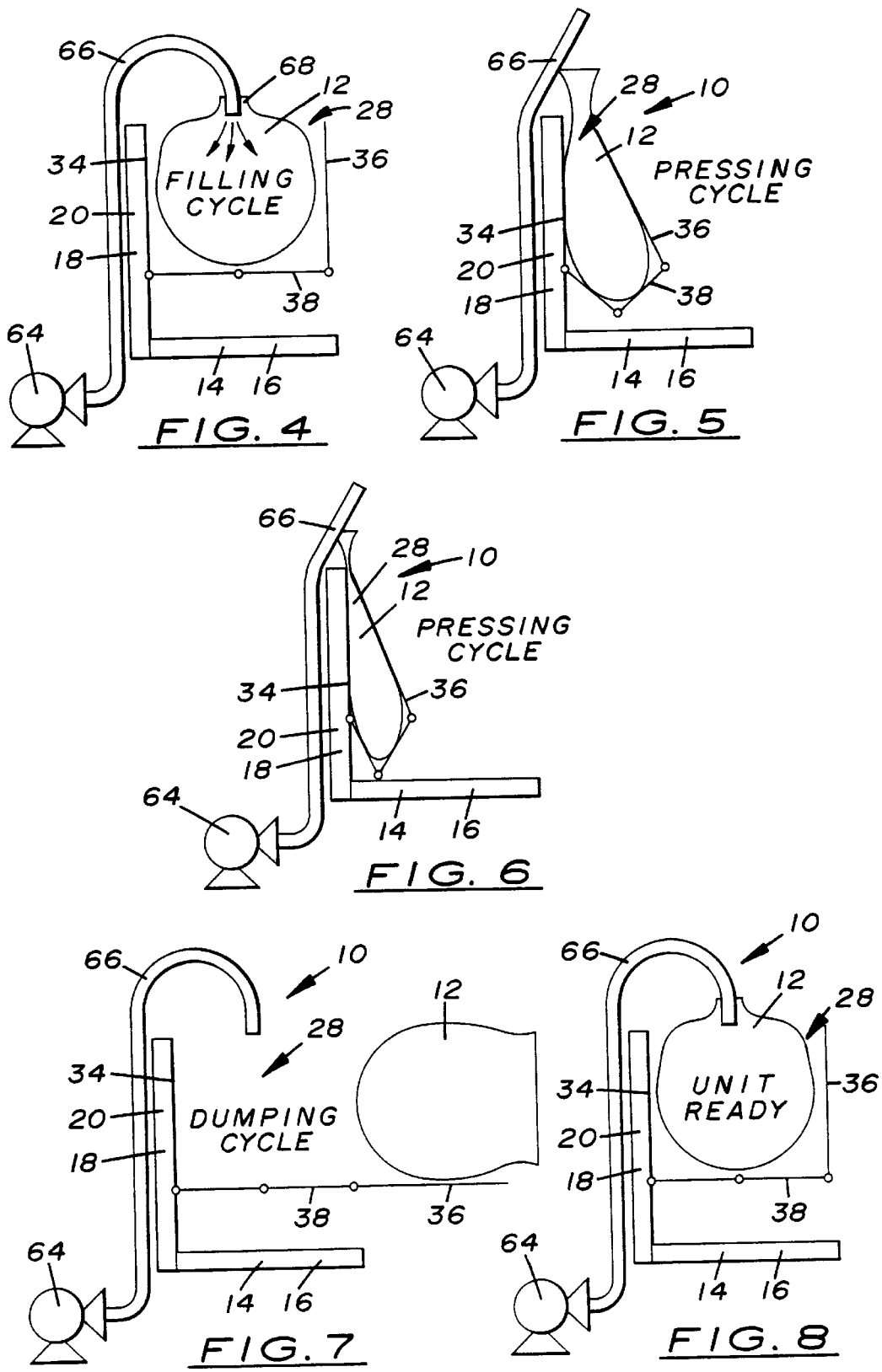

WATER/SLUDGE FILTER PRESS

BACKGROUND OF THE INVENTION (a) Field of the Invention

This invention relates to a filter press and more particularly, but not by way of limitation, to a filter press used for receiving a filter bag for filtering sludge from water and dewatering the sludge in the bag.

(b) Discussion of Prior Art

Heretofore, the problem of sludge concentration has been something that has been studied for many years and to date the best solutions to the problem has been the use of belt presses, filter presses and centrifuges. Therefore there has been an ongoing need for a user friendly and simple water filter with filter press that is easy to use and still produces dewatered sludge that is acceptable for the disposal criteria demanded by current federal and state regulations. Today, current technologies require that sludge be pretreated or thickened prior to entering filter units. This type of technology requires doses of polymer or coagulant that is both costly and difficult to manage. Changes in contaminants require a new treatment scheme to cross-link the sludge and produce a filterable sludge. The water treatment industry has searched in vain for a simple treatment of sludge that will work in a variety of circumstances.

In U.S. Pat. No. 1,145,372 to Krause, a bag filter for the separation of one liquid from another is described. The invention is used particularly in steam power plants for separating oil and grease from water. In U.S. Pat. No. 722,172 to Bolz and U.S. Pat. No. 812,933 to Kiefer combination filters and presses are used for filtering different types of liquid materials. The material in the filters is allowed to drain by gravity with the remaining material in the filter compressed by a press member. In U.S. Pat. No. 4,263,330 to Streeter et al. a cheese press is disclosed. Cheese whey is deposited in the press and allowed to drain by gravity. A pressure plate is then applied to the top of the press for further draining of the whey from cheese curds. In U.S. Pat. No. 3,521,754 to Ireland a filter bag and container is described. Material to be filtered is deposited into the bag and the bag is withdrawn from the container. The bag as it is withdrawn is squeezed by a constricted top opening. In U.S. Pat. No. 5,262,070 to Ishida, a press for engaging a flexible container holding different types of blood components is disclosed.

None of the above mentioned prior art patents describe the unique combination of structure, features and advantages of the subject water/sludge filter press used with a filter bag for filtering sludge.

SUMMARY OF THE INVENTION

In view of the foregoing, it is a primary object of the subject invention to provide a simple, compact and efficient water/sludge filter press which can be used with a filter bag for dewatering sludge in the filter bag.

Another object of the invention is that the unit allows for gravity separation of the sludge in the filter bag without thickening the sludge or adding polymers or coagulants.

Still another object of the invention is when the filter press is actuated, the filter bag in the filter press is compressed therein for dewatering the sludge in the bag. The dewatering of the sludge allows for ease in removing the sludge and reusing the bag. Also the bag with dewatered sludge can be easily disposed and the bag replaced inside the filter press.

Yet another object of the invention is the filter press can be made for different size filter bags and for handling different water flow rates received through the filter bags for filtering sludge.

The subject invention includes a horizontal stand with an upright vertical press frame. A hydraulic cylinder with piston is mounted on the vertical press frame. Attached to the vertical press frame is an open-top housing for filter bag adapted for receiving the filter bag therein. The housing may be made of different sizes for receiving different size filter bags. The sides and bottom of the housing are lined with screens for passing filtered water therethrough. The housing includes a first vertical side, a second vertical side, a stationary vertical press plate, a vertical movable press plate and a foldable bottom. The foldable bottom includes a pair of pivot arms attached to the piston of the hydraulic cylinder. The foldable bottom is also attached to a lower end of a pair of coil springs. An upper end of the coil springs is attached to one end of a pair of spring arms. An opposite end of the spring arms is attached to the vertical movable press plate and the vertical stationary press plate. When the hydraulic cylinder is actuated, the piston moves upwardly pivoting the pivot arms downwardly folding the bottom and moving the movable press plate inwardly in the filter bag housing. Also the top of the movable press plate engages the top of the filter bag as the movable press plate moves inwardly to prevent sludge from escaping out the top of the filter bag. At this time the filter bag is compressed between the stationary press plate and the movable press plate with the sludge therein being compressed and dewatered. The top of the filter bag is sealed between the top of the vertical movable plate and the stationary vertical press plate.

These and other objects of the present invention will become apparent to those familiar with the different types filter presses and methods and processes dealing with the dewatering of sludge in filter bags when reviewing the following detailed description, showing novel construction, combination, and elements as herein described, and more particularly defined by the claims, it being understood that changes in the embodiments to the herein disclosed invention are meant to be included as coming within the scope of the claims, except insofar as they may be precluded by the prior art.

BRIEF DESCRIPTION OF THE DRAWINGS

The accompanying drawings illustrate complete preferred embodiments of the present invention according to the best modes presently devised for the practical application of the principles thereof, and in which:

FIG. 4 illustrates a simplistic side view of the filter press during the filling cycle of the filter bag inside the open-top housing. A first side of the housing has been removed to illustrate the filter bag received inside the housing.

FIG. 5 is similar to the side view of the filter press shown in FIG. 4 but with the hydraulic cylinder actuated with the cylinder's piston partially retracted and the vertical movable press plate moved from right to left and engaging the top of the filter bag to prevent sludge from escaping out the top of the filter bag when the filter bag is compressed therein.

FIG. 6 is similar to FIGS. 4 and 5 and illustrates the hydraulic cylinder actuated with the piston fully retracted and the filter bag being completely compressed inside the housing for dewatering the sludge inside the filter bag.

FIG. 7 is similar to FIGS. 4–6 with the compressing of the filter bag completed and the vertical movable press plate pivoted downwardly for removing the filter bag with dewatered sludge therein.

FIG. 8 is similar to FIG. 4 and illustrates a new filter bag placed inside the open-top bag housing and ready for repeating the filtering process for removing sludge from water flowing in and through the filter bag.

DESCRIPTION OF THE PREFERRED EMBODIMENTS

Figure 1:
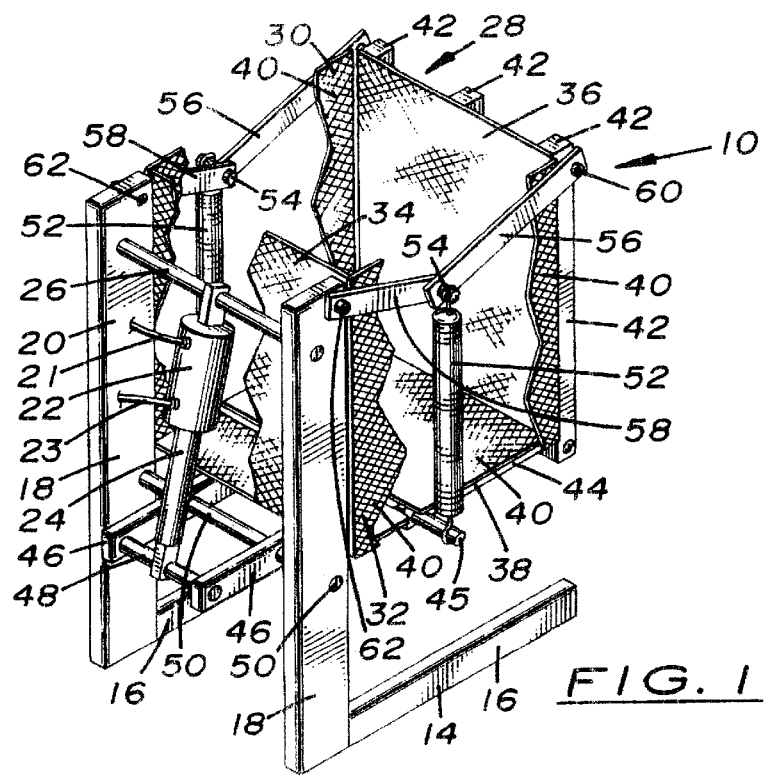
FIG. 1 is a perspective view of the water/sludge filter press used with a filter bag for filtering sludge in the bag. The filter bag is not shown in this drawing. The filter press is shown with a horizontal stand and an upright vertical press frame. A hydraulic cylinder with piston is mounted on the vertical press frame. Attached to the vertical press frame is an open-top housing adapted for receiving the filter bag therein.

In FIG. 1, a perspective view of the water/sludge filter press is shown having general reference numeral 10. The filter press 10 is used with a filter bag 12 for filtering water, capturing sludge in the water and dewatering the sludge in the bag 12. The filter bag 12 is not shown in FIG. 1 but is shown in FIGS. 4–8. The filter press 10 includes a horizontal stand 14 with a pair of legs 16 for engaging a flat floor surface. The legs 16 are attached at one end to a pair of upright vertical posts 18 which make up part of vertical press frame 20. The press frame 20 includes a hydraulic cylinder 22 with piston 24. The hydraulic cylinder 22 includes hydraulic lines 21 and 23 for operating the cylinder. The top of the hydraulic cylinder 22 is attached to a cylinder mounting arm 26. Opposite ends of the cylinder arm 26 are attached to an upper portion of the vertical posts 18.

Attached to the vertical press frame 20 is an open-top housing having a general reference numeral 28. The housing 28 is adapted for receiving different sizes of filter bags 12 for filtering water with different flow rates received in the bag. The housing 28 includes a first vertical side 30, a second vertical side 32, a stationary vertical press plate 34 attached to the vertical posts 18, a vertical movable press plate 36 and a horizontal foldable bottom 38. The housing 28 is lined with perforated screens 40 attached to the vertical sides 30 and 32, the stationary press plate 34 and the foldable bottom 38. Also, a screen 40 is attached to a movable press plate frame 42. The press plate frame 42 is part of the movable press plate 34. The screens 40 allow the filtered water from the bag 12 to escape outwardly from the housing 28. In FIG. 1, part of the screens 40 used with first vertical side 30 and second vertical side 32 are cut away for ease in illustrating the various structural features of the subject filter press 10.

The foldable bottom 38 also includes a foldable bottom frame 44 which is pivotly mounted on pivot pins 45 to one end of a pair of outwardly extending pivot arms 46. Only one of the pivot pins 45 is shown in this drawing. An opposite end of the pivot arms 46 are attached to a piston connecting rod 48. The piston connecting rod 48 is attached to the lower end of the piston 24. The pivot arms 46 are pivotly mounted on a pivot connecting rod 50. Opposite ends of the pivot connecting rod 50 are attached to a lower portion of the two upright vertical posts 18. A portion of the pivot arms 46 to the right of the pivot connecting rod 48 and the bottom frame 44 form the foldable bottom 38.

The foldable bottom 38 is also attached via pivot pins 45 to a lower end of a pair of coil springs 52. An upper end of the coil springs 52 is attached via pivot pins 54 to one end of a pair of first spring arms 56 and second spring arms 58. Opposite ends of the first spring arms 56 are attached to the top of the press plate frame 42 by pivot pins 60. Also, opposite ends of the second spring arms 58 are attached to the top of the two upright vertical posts 18 by pivot pins 62. It should be noted that by removing the pivot pins 60 from the first spring arms 56 and press plate frame 42, the movable press plate 36 can be lower for ease in removing the filter bag 12 from the bag housing 28 as shown in FIG. 7.

In operation, when the hydraulic cylinder 22 is actuated, the piston 24 moves upwardly pivoting the pivot arms 46 about the pivot arm 50. At this time, the foldable bottom 38 with screen 40 thereon moves downwardly with the filter bag 12. The coil springs 52 are placed in tension with the pair of springs arms 56 and 58 folded inwardly and downwardly toward each other. The movable press plate 36 now moves from right to left toward the stationary press plate 36 squeezing and compressing the filter bag 12 therebetween and the sludge trapped therein.

Figures 2, 3:
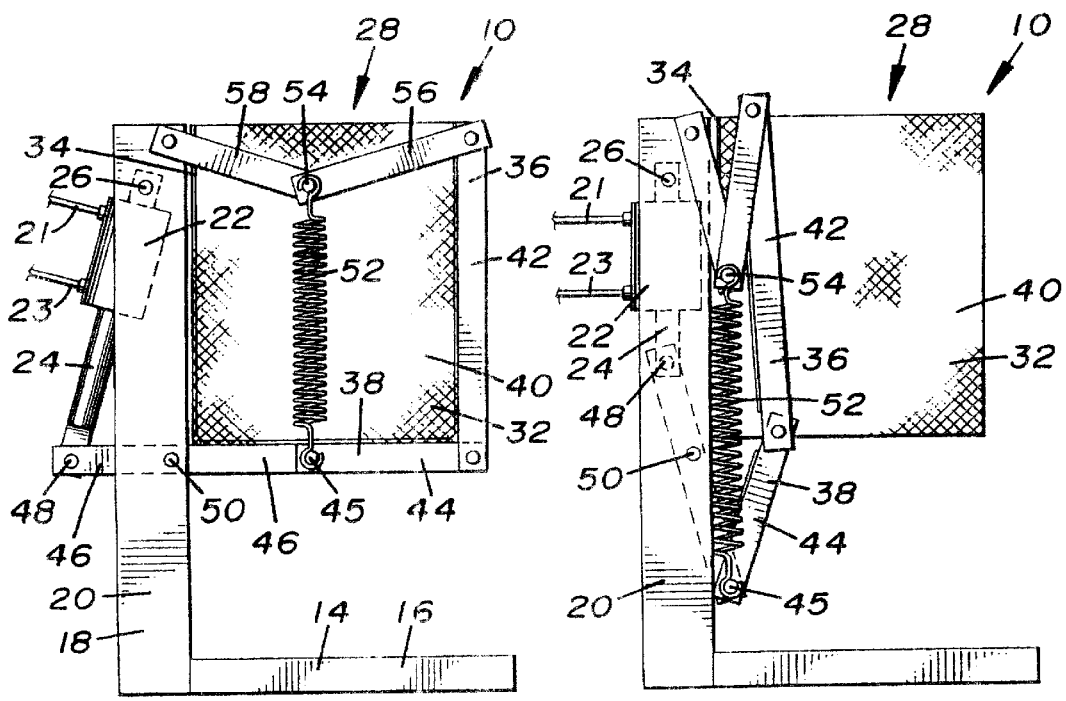
FIG. 2 illustrates a side view of the water/sludge filter press with the open-top housing in an open position.
FIG. 3 illustrates a side view of the water/sludge filter press similar to FIG. 2 but with the hydraulic cylinder actuated and a bottom of the housing folded downwardly and a vertical movable press plate moved inwardly for compressing the filter bag and dewatering the sludge therein.

In FIG. 2, a side view of the water/sludge filter press 10 is illustrated with the open-top filter bag housing 28 in an open position. In this drawing, the piston 24 is in a fully extended position with the foldable bottom 38 in a horizontal position for holding a filter bag 12 thereon. The springs 52 are in a normal relaxed position with the first and second spring arms 56 and 58 holding the movable press plate 36 in a spaced relationship from the stationary press plate 34.

In FIG. 3, a side view of the water/sludge filter press 10 is illustrated and similar to FIG. 2 but with the hydraulic cylinder 22 actuated and the piston 24 retracted. The piston 24 has pivoted the pivot arms 46 about the axis of the pivot connecting rod 50 thereby folding the foldable bottom 38 downwardly. The coil springs 52 have been placed in tension and the connected first and second spring arms 56 and 58 pivoted downwardly. It should be noted that as the first and second spring arms 56 and 58 are pivoted downwardly, a top portion of the movable press plate 36 moves from right to left and by the nature of the linkage design rides over the top of the filter bag 12 thereby sealing the top of the bag 12 and preventing any sludge escaping outwardly from the bag. This feature of the filter press 10 is shown in FIGS. 5 and 6.

In FIG. 4, a simplistic side view of the filter press 10 is shown during the filling cycle of the filter bag 12 inside the open-top housing 28. In this drawing, a water pump 64 with delivery hose 66 is shown for introducing water to be filtered into an open top 68 of the bag 12. The water pump 64 may be of different sizes for delivering various volumes of water through different size filter bags 12 received in the housing 28. In this drawing, the first and second vertical sides 30 and 32 have been removed to illustrate the filter bag 12 filtering water inside the housing 28.

In FIG. 5, the filter press 10 is shown with the hydraulic cylinder 22 actuated and the cylinder's piston 24 partially retracted and the vertical movable press plate 36 moved from right to left and engaging the top 68 of the filter bag 12 to prevent sludge from escaping out the top of the filter bag when the filter bag 12 is compressed therein. The hydraulic cylinder 22 and piston 24 are not shown in FIGS. 4–8.

FIG. 6 is similar to FIGS. 4 and 5 and illustrates the hydraulic cylinder 22 actuated with the piston 24 fully retracted and the filter bag 12 being completely compressed inside the housing 28 for dewatering the sludge inside the filter bag 12.

In FIG. 7, which is similar to FIGS. 4–6, the compressing of the filter bag 12 has been completed. At this time, the vertical movable press plate 36 is pivoted downwardly for ease in removing the filter bag 12 with the dewatered sludge therein.

In FIG. 8, a new filter bag 12 or the old filter bag 12 with the sludge removed from the bag has been placed inside the open-top housing 28. The end of the water delivery hose 66 is inserted into the open top 68 of the filter bag 12. The process of filtering the water from the hose 66 and collecting sludge in the bag 12 is now repeated using the unique filter press 10 as described above.

While the invention has been shown, described and illustrated in detail with reference to the preferred embodiments and modifications thereof, it should be understood by those skilled in the art that equivalent changes in form and detail may be made therein without departing from the true spirit and scope of the invention as claimed, except as precluded by the prior art.

The embodiments of the invention for which an exclusive privilege and property right is claimed are defined as follows:

1. A water/sludge filter press used with a filter bag for filtering water and collecting sludge in the bag, the filter press used for dewatering the sludge collected in the bag, the filter press comprising:

a press frame;

an open-top housing adapted for receiving the filter bag therein, said housing attached to said press frame, said housing having a first side, a second side and a foldable bottom, said foldable bottom including a pair of pivot arms, said housing having compression means attached to said pair of pivot arms, said compression means for engaging and compressing the filter bag therein; and means for actuating and driving said compression means, said means for actuating and driving said compression means attached to said press frame and said compression means.

2. The filter press as described in claim 1 wherein said compression means includes a stationary press plate and a vertical movable press plate mounted on said open-top housing.

3. The filter press as described in claim 1 wherein said means for actuating and driving said compression means is a hydraulic cylinder and piston, said piston attached to said compression means.

4. A water/sludge filter press used with a filter bag for filtering water and collecting sludge in the bag, the filter press used for dewatering the sludge collected in the bag, the filter press comprising:

a press frame with horizontal stand;

an open-top housing adapted for receiving the filter bag therein, said housing attached to said press frame, said housing having a first side, a second side, a bottom, a stationary press plate and a movable press plate, said bottom having a foldable bottom including a pair of pivot arms, said stationary press plate and said movable press plate adapted for engaging and compressing the filter bag therebetween; and means for moving said movable press plate inwardly inside said housing and compressing said filter bag therein, said means for moving attached to said press frame and attached to said pair of pivot arms.

5. The filter press as described in claim 4 wherein said means for moving is a hydraulic cylinder and piston, said piston attached to said pivot arms, said hydraulic cylinder attached to said press frame.

6. The filter press as described in claim 4 wherein said open-top housing includes a pair of coil springs, a lower end of said coil springs attached to said foldable bottom, an upper end of said coil springs attached to one end of a pair of spring arms, an opposite end of said spring arms is attached to said movable press plate and said stationary press plate.

7. A water/sludge filter press used with a filter bag for filtering water and collecting sludge in the bag, the filter press used for dewatering the sludge collected in the bag, the filter press comprising:

a horizontal stand attached to an upright vertical press frame;

a hydraulic cylinder with piston mounted on said vertical press frame;

an open-top housing adapted for receiving the filter bag therein, said housing attached to said press frame, said housing including a first vertical side, a second vertical side, a stationary vertical press plate, a vertical movable press plate and a foldable bottom, said foldable bottom including a pair of pivot arms attached to said piston; and a pair of coil springs, a lower end of said coil springs attached to said foldable bottom, an upper end of said coil springs attached to one end of a pair of spring arms, an opposite end of said spring arms is attached to said vertical movable press plate and said vertical stationary press plate;

whereby when said hydraulic cylinder is actuated, said piston moves upwardly pivoting said pivot arms downwardly folding the said foldable bottom and moving said movable press plate inwardly in said housing and at this time the filter bag is compressed between said stationary press plate and said movable press plate with the sludge therein being compressed and dewatered.

8. The filter press as described in claim 7 wherein said press frame includes a pair of upright vertical posts, said stationary vertical press plate attached to an upper portion of said vertical posts.

9. The filter press as described in claim 8 wherein said hydraulic cylinder is attached to a cylinder mounting arm, ends of said mounting arm attached to an upper portion of said vertical posts.

10. The filter press as described in claim 8 wherein said pivot arms are pivotly mounted on a pivot connecting rod, ends of said connecting rod attached to a lower portion of said vertical posts.

11. The filter press as described in claim 7 wherein one end of said pivot arms are pivotly attached to said foldable bottom, an opposite end of said pivot arms attached to a piston connecting rod, said piston connecting rod attached to said piston.

12. The filter press as described in claim 7 wherein said the opposite end of said spring arms are pivotly attached to said vertical movable press plate and said vertical stationary press plate, whereby when said hydraulic cylinder is actuated and said piston moves upwardly pivoting said pivot arms downwardly folding the said foldable bottom, said movable press plate is moved inwardly in said housing and the top and sides of the filter bag are compressed between said stationary press plate and said movable press plate.

13. The filter press as described in claim 7 wherein said first vertical side, said second vertical side, said stationary vertical press plate, said vertical movable press plate and said foldable bottom include screens attached thereto.

\* \* \* \* \*